United States Patent [19]

Troyer et al.

[11] 3,798,409
[45] Mar. 19, 1974

[54] FUME EXTRACTING WELDING GUN NOZZLE

[75] Inventors: Wade E. Troyer; Leo E. Wildenthaler, both of Troy, Ohio

[73] Assignee: Hobart Brothers Company, Troy, Ohio

[22] Filed: Sept. 22, 1971

[21] Appl. No.: 182,596

[52] U.S. Cl. .................... 219/130, 219/74, 219/75, 219/136, 228/20
[51] Int. Cl. ............................................. B23k 9/00
[58] Field of Search ............ 219/137, 136, 130, 75, 219/74; 228/20

[56] References Cited
UNITED STATES PATENTS

| | | | |
|---|---|---|---|
| 2,768,278 | 10/1956 | Gaines | 219/74 |
| 3,514,567 | 5/1970 | Strang | 219/75 |
| 2,310,164 | 2/1943 | Prendergast et al. | 219/75 |
| 2,389,969 | 11/1945 | Fadeley | 219/74 |
| 2,184,980 | 12/1939 | Smith | 228/20 |

FOREIGN PATENTS OR APPLICATIONS

| | | | |
|---|---|---|---|
| 1,134,557 | 11/1968 | Great Britain | 219/130 |
| 1,526,305 | 5/1968 | France | 219/130 |

OTHER PUBLICATIONS

"Carbon Monoxide Hazard in the Carbon Dioxide Arc Welding Process" Annals of Occupation Hygiene; Vol. 7, pp. 253-259, 1964.

"Development of Special Welding Nozzle Configuration" by Mishler, Monroe, Martin Batelle Memorial Institute, pp. 1-28, 9/62.

"Arc Welding of Galvanized Steel" Welding Journal; August 1968, pp. 644-649.

"Fume Extraction When Welding Fine Coated Steels" American Industrial Hygiene Assoc. Journal; Vol. 32, 3/71, pp. 170-173.

Primary Examiner—J. V. Truhe
Assistant Examiner—George A. Montanye
Attorney, Agent, or Firm—Biebel, French & Bugg

[57] ABSTRACT

A welding gun nozzle including a first passageway through which welding wire may be fed into a weld and a second passageway through which shielding gas may be directed over the weld to protect the molten metal from contamination. The nozzle also includes a fume extracting passageway having an inlet orifice so located with respect to the outlet end of the nozzle that the fumes are drawn into the nozzle from a region laterally outward from the nozzle, and thus from an area removed from the weld, so the shielding gas is relatively unaffected by the operation of the fume extracting feature of the invention.

9 Claims, 6 Drawing Figures

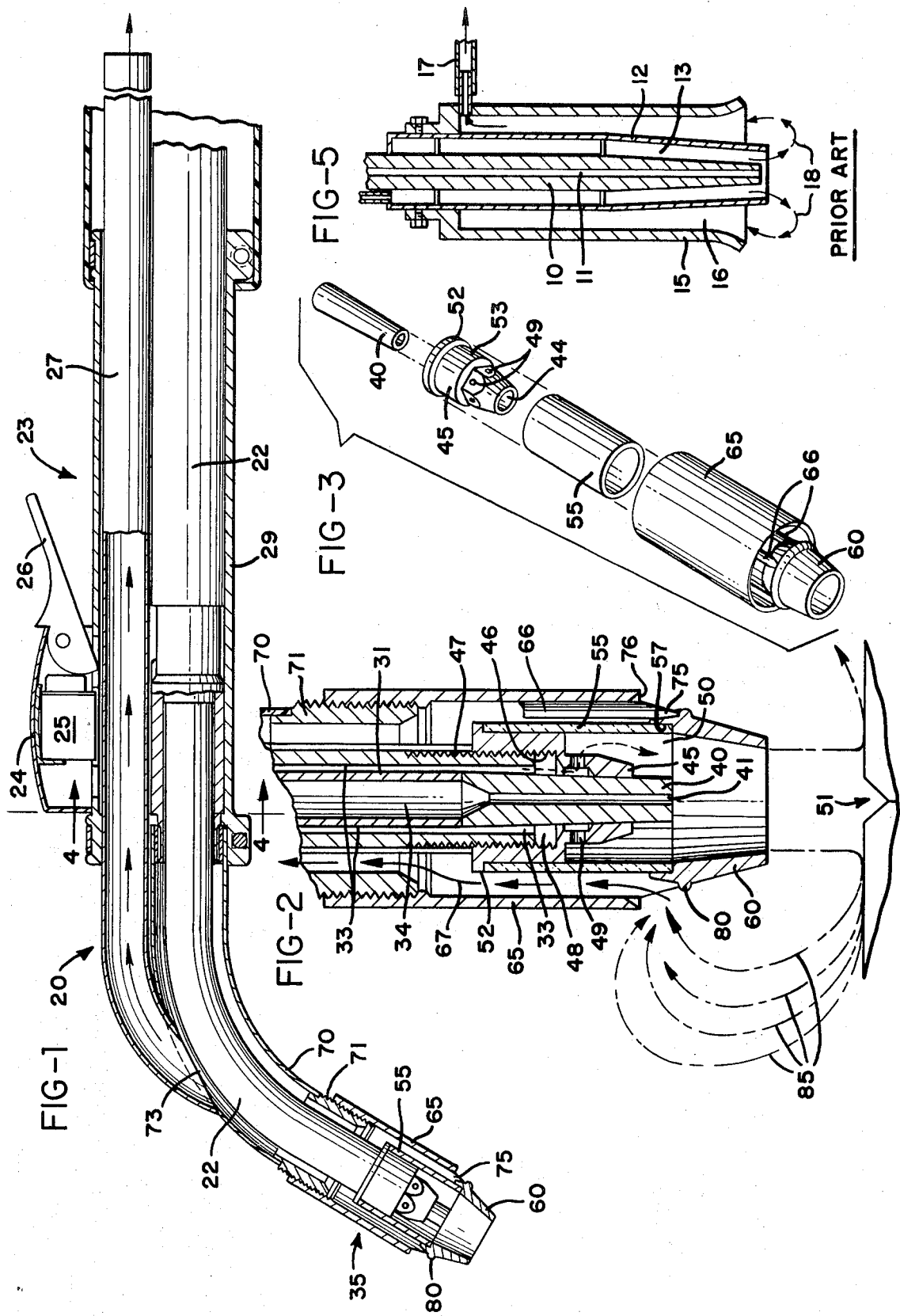

FUME EXTRACTING WELDING GUN NOZZLE

BACKGROUND OF THE INVENTION

During the welding of metallic parts, gases and solid matter are generated which not only tend to obstruct the operator's vision of the weld, but also cause visual and respiratory discomfort. This is especially true when welding in confined areas, such as assembly lines in factories, where several welding operations may be in progress simultaneously.

There have been several prior art attempts to combine a fume extracting device with a welding gun. Examples of prior devices are found in U.S. Pat. Nos. 2,768,278 and 3,514,567 and French Pat. No. 1,526,305.

One difficulty encountered in the prior art fume extracting devices is in the interference of the fume extracting nozzle with the shielding gas. Another disadvantage is in the size of the fume extracting nozzle and the fact that a large nozzle will interfere with the operator's vision of the weld. A third disadvantage is in the heat of the fumes drawn away from the weld causing the fume conduits to deteriorate and the gun itself to become too hot to be handled by the operator.

SUMMARY OF THE INVENTION

This invention relates to an improved welding gun nozzle which includes means to extract and remove fumes from a weld. This device is useful with both gas shielded and non-shielded welding guns.

In the preferred embodiment of the invention, a welding nozzle includes a first passageway through which welding wire may be fed into a weld and a second passageway through which shielding gas may be directed over the weld to protect the molten metal from contamination. The nozzle also includes a fume extracting passageway so located with respect to the outlet end of the nozzle so that the fumes are drawn into the nozzle at an angle substantially normal to the direction of flow of the shielding gas as it leaves the nozzle. In the preferred embodiment, the fume extracting passageway is formed between concentric cylindrical members, with the opening to this chamber surrounding, but spaced away from the end of the nozzle. The nozzle is so designed as to be small in diameter so as not to obstruct the operator's vision, and the fume inlet orifice is so designed so as not to impair the shielding effect of any shielding gas used. The improved welding gun nozzle therefore provides a compact, easy to use, and lightweight device which also removes obnoxious and possibly harmful fumes generated by welding but which does not obstruct the operator's view of the weld.

The invention also includes means for cooling a welding gun employing the fume extracting nozzle which allows a welding gun and those hoses used to be made of smaller and lighter material and yet have long life.

Along with the fumes, the nozzle also draws in ambient air in large quantities, and as a result, the nozzle will actually operate at cooler temperatures than conventional nozzles. For this reason, nozzles constructed according to this invention may be made smaller than conventional nozzles.

Due to the unique design of the nozzle and the concentric arrangement of the fume extracting portion of the gun, a welding gun employing this unique nozzle may be used in the same manner and at the same working angles as prior art guns constructed without the fume extracting feature.

Accordingly, it is an object of this invention to provide an improved welding gun nozzle in which a fume extracting chamber is formed concentric with a conventional nozzle and which has its orifice so designed as to draw in fumes from a region laterally outward from the nozzle; and to provide an improved welding nozzle which is so constructed that the total size of the nozzle is no larger, and in fact may be made smaller, than conventional nozzles.

Other objects and advantages of the invention will be apparent from the following description, the accompanying drawings and the appended claims.

BRIEF DESCRIPTION OF THE DRAWINGS

FIG. 1 is an elevational view, partly in cross section, showing a welding gun including the improved welding nozzle constructed according to this invention;

FIG. 2 is a cross sectional view of the improved fume extracting welding gun nozzle constructed according to this invention;

FIG. 3 is an exploded perspective view of the improved nozzle;

FIG. 5 is a cross sectional view of a prior art welding gun nozzle; and

DESCRIPTION OF THE PREFERRED EMBODIMENT

Figure 4:
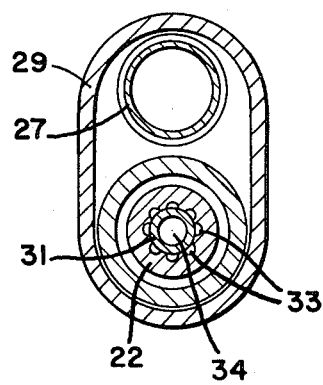
FIG. 4 is a cross sectional view taken along line 4—4 in FIG. 1.

Referring first to FIG. 5 which shows a prior gun illustrated in French Pat. No. 1,526,305, an electrode guide tube 10 includes a passage 11 through which welding wire may be directed downwardly into a weld. Concentric with the guide tube 10 is a cylindrical member 12 which, in combination with the guide tube, forms a shielding gas passageway 13. Concentric with both the guide tube 10 and the cylindrical member 14 is a second cylindrical member 15, and this member in combination with the cylindrical member 12 forms a fume extracting passageway 16. An outlet port 17 is connected to a suction source to draw fumes from the passageway. As represented by the arrows 18, shielding gas and the fumes produced by welding are drawn into the passageway 16 and thus removed from the welding area.

This type of prior art device has several inherent disadvantages. First, depending upon the efficiency of the suction source, the shielding gas may be removed too quickly from the molten weld material, thus leaving it at least partially unprotected. Second, the location of the outlet port 17 will cause an uneven withdrawl of the fumes in the area of the weld, since the pressure gradient across the passageway is inherently uneven.

The present invention, however, overcomes both of these disadvantages by locating the orifice through which the fumes are drawn a sufficient distance back of the nozzle and by causing the fumes to enter this orifice at substantially right angles to the axis of the nozzle thereby insuring that the shielding gas remains substantially unaffected by the operation of the fume extracting feature of the nozzle. Also, the nozzle is so designed that the fumes are drawn into the nozzle at a substantially constant rate throughout the circumference of the orifice.

Referring now to FIGS. 1–4 which illustrate one embodiment of the invention, a welding gun 20 includes an inner conduit 22 which carries shielding gas and the welding wire from an external source, not shown. The handle of the gun 20 is shown generally at 23 and includes a control switch 24 in which is located an electrical switch 25 actuated by a handle 26. Electrical wires from the switch 25 are also carried by the inner conduit 22 to the control mechanism to cause the wire feeding device to advance the welding wire into the weld and also to cause shielding gas to be introduced to protect the weld from the atmosphere.

Also included within the handle 23 is a fume conduit 27. Both the inner conduit 22 and the fume conduit 27 are surrounded by an outer casing 29.

As shown in FIGS. 2 and 4, the inner conduit 22 includes a wire guide tube 31, and surrounding the wire guide tube are a plurality of gas passageways 33. The wire guide tube 31 includes a central opening 34 which guides the welding wire through the inner conduit.

Referring now to FIGS. 2 and 3, the welding nozzle 35 includes a first cylindrical member or contact tip 40 including a passageway 41 formed therein for directing the welding wire into the weld. At the upper end of the contact tip, the passageway 41 opens up so that it has substantially the same diameter as the passageway in the wire guide tube 31. This facilitates the guiding of the end of the welding wire into the contact tip and into the weld. The contact tip 40, in addition to guiding the welding wire, also supplies substantially all the electrical energy to the wire so that there is practically no resistance heating of the wire prior to its exiting the lower end of the contact tip.

The contact tip 40 is received into and extended through a tapered opening 44 formed in a tip holder 45. The contact tip 40 is also tapered, and these two surfaces form a good electrical contact. The tip holder 45 includes an internal thread 46 which cooperates with an external thread 47 on the wire guide tube 31 to cause the contact tip to firmly and positively engage the end of the wire guide portion of the tube. Between the end of the wire guide 31 and the contact tip is formed a manifold 48 into which the shielding gas from conduit 33 flows, and then exits through a plurality of radially positioned openings 49 into a chamber 50 where shielding gas is then directed over the weld 51.

The tip holder 45 includes a radially outstanding flange 52 located in its uppermost portion, and a cylindrical body portion 53. An insulator cylinder 55 has an inside diameter substantially equal to the outside diameter of the body portion 53 and its upper movement on the tip holder is limited by the flange 52. The lower end of the insulator cylinder 55 is received into a relief 57 formed in a nozzle ring 60. The internal dimensions of the nozzle ring 60 are substantially the same as the internal dimension of the insulator cylinder 55, and therefore shielding gas from the chamber 50 will flow evenly and without substantial turbulence through the passageway thus formed and over the weld 51.

The nozzle ring 60 is connected to a second cylindrical member or outer shell 65 by means of three spacer rods 66. Thus, the nozzle ring is fully supported and yet is maintained in an electrically insulated relation to the contact tip 40 and tip holder 45 so that the nozzle ring carries no electrical energy. This permits the ring to contact the work without causing an electrical arc to be created therebetween. As shown in FIG. 2, the outer shell 65, together with the insulator cylinder 55, forms therebetween a chamber or fume extracting passageway 67 into which the fumes created at the weld may be drawn. This passageway extends upwardly past the outer shell 66 into a passageway formed between the inner conduit 22 and an exhaust jacket 70. As shown in FIGS. 1 and 2, the exhaust jacket 70 is connected to a ring 71 onto which the outer shell 65 is threaded. The exhaust jacket 70 has formed therein an opening 73 which connects the fume extracting passageway 67 with the fume conduit 27. By locating the opening 73 in the exhaust jacket 70 substantially in line with the fume passageway, or at the place where the welding gun is curved, substantially equal pressures exist completely around the complete circumferential extent of the orifice 75.

As is thus best seen in FIG. 2, an orifice 75 is therefore formed between the lower end 76 of the outer shell 65 and the nozzle ring 60. The nozzle ring 60 also includes an annular ring 80 which completely surrounds the nozzle ring and which cooperates with the end 76 of the outer shell 65 to cause the fumes to be drawn into the chamber 67 from a region laterally outward from the axis of the nozzle. The ring 80 and the end 76 of the outer shell 65 thus form means for isolating the flow of fumes into the passageway 67 from the shielding gas flowing out of the nozzle.

By causing the fumes to be drawn into the orifice 75 in this way, the effect on the shielding gas is minimized while permitting most, if not all, of the fumes to be withdrawn from the area of the weld. In positioning the orifice 75, consideration is given to the fact that the amount of heat drawn into the nozzle is a function of the proximity of the orifice to the welding arc. Therefore it is desirable to place the orifice as far back on the nozzle as possible, keeping in mind that if it is placed too far back, it will not be efficient in capturing the fumes.

As shown by dashed lines 85, fumes from the weld 81 are drawn in a circular path and enter the orifice 75 at an angle substantially normal to the direction of flow of the shielding gas as it leaves the nozzle. Therefore, the fumes are captured only after they rise vertically a sufficient distance to be included in the envelope which is formed laterally outward around the orifice 75.

The flow of fumes into the orifice 75 will be mixed with ambient air which tends to cool the fumes and also the entire nozzle. As a result, nozzles of smaller dimension may be constructed than was possible with conventional welding guns. In the preferred embodiment of the invention, the fume extracting conduit 27 is connected to a vacuum source through a filter, not shown, which removes the particulate matter from the fumes. An exhaust flow in the order of 25 to 40 cubic feet per minute is considered adequate for a nozzle having an outside diameter of 1 ¼ inches.

Figure 6:
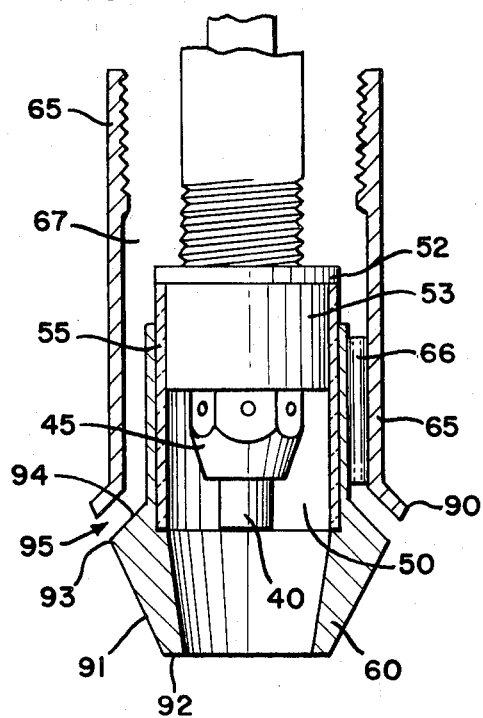
FIG. 6 is a cross sectional view of another embodiment of a welding gun nozzle constructed according to this invention.

Another embodiment of the invention is shown in FIG. 6, the same reference numerals being used for similar parts. This embodiment is similar to that shown in FIG. 2, except that the outer shell 65 is flared outwardly at its lower end 90. The outer surface 91 of the nozzle ring 60 is conical and extends outwardly from the lower end 92 to a maximum diameter at 93. Surface 94 is also conical and cooperates with the flared portion 90 of the outer shell to form an inlet orifice 95 which communicates with the fume chamber 67. Thus, fumes are drawn into the chamber 67 through the outwardly facing orifice 95 from a region laterally outward from the nozzle and therefore the shielding gas which is directed toward the weld from passageway 50 remains relatively unaffected by the operation of the fum extracting feature of the invention.

The welding nozzle thus described differs from the prior art devices shown in FIG. 5 primarily in that the fumes are drawn into the nozzle in such a way that the shielding gas is allowed to perform its function before the fumes and the shielding gas are removed from the area of the weld. Also, a welding gun nozzle of smaller dimension is provided in which the pressure completely around the orifice is maintained substantially constant so that fumes leaving the welding area in any direction are trapped and drawn into the gun and thus removed from the environment. This improves the operator's visibility and also provides a cleaner environment in which to work. Also, the improved nozzle allows the welding gun to be used with substantially the same gun-to-work angles and nozzle-to-work distances previously established with conventional welding guns.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a torch for use in welding during which smoke or fumes are created, and having a nozzle through which welding current is delivered to a workpiece, the improvement in said nozzle comprising a first member having an end which may be placed in a region where smoke or fumes are generated, said member including means defining a first passageway therethrough, a second member coaxial with and surrounding said first member and spaced radially therefrom along an axis to define therebetween a chamber into which smoke or fumes may be drawn, said second member having an end spaced from the end of said first member along said axis, means on said first member positioned between the end of said second member and the end of said first member and extending radially outward from said axis to a distance substantially equal to the distance of radial spacing of said second member so as to define a substantially continuous opening forming the sole interconnection from external of said nozzle to said chamber and formed between the end of said second member and the means extending outward on said first member, means for connecting a source of negative pressure to said chamber to induce air flow into said opening thereby to remove smoke and fumes from a region laterally outwardly of said opening.

2. The torch of claim 1 wherein said first and second members are cylindrical.

3. The torch of claim 1 wherein said first member is frusto-conical in configuration and wherein said means on said first member extending outwardly therefrom is an annular ridge.

4. The torch of claim 1 for use in welding wherein said first member includes a nozzle ring supported from said second member by spacer rods, a guide tube including passageways for supplying shielding gas and welding wire, said guide tube carrying electrical current to said welding wire, and an insulator member extending between said guide tube and said nozzle ring whereby shielding gas and welding wire may be directed into a weld while being isolated from the smoke or fumes drawn into said chamber, and whereby said nozzle ring is electrically insulated from said guide tube.

5. A nozzle for use in operation where smoke or fumes are created, said nozzle comprising a first member having an end which may be placed in the region where smoke or fumes are created, said first member including means defining a first passageway therethrough, a second member coaxial with and surrounding said first member and spaced radially therefrom along an axis to define therebetween a chamber into which smoke or fumes may be drawn, said second member having an end spaced from the end of said first member along said axis, means positioned between the end of the second member and the end of the first member and extending outwardly from said first member a distance substantially equal to the distance of radial spacing of said second member so as to form between the end of said second member and the means extending outwardly on said first member a substantially continuous opening forming the sole interconnection from external of said nozzle to said chamber, and means for connecting said chamber to a source of negative pressure whereby air flow into said opening will remove smoke or fumes from a region laterally outwardly of said opening.

6. The nozzle of claim 5 further including a contact tip within said first passageway for directing welding wire into a weld, and means for connecting said contact tip to a source of electrical current whereby current is provided to said welding wire as it exits said contact tip.

7. The nozzle of claim 5 wherein said first member further includes a second passageway through which shielding gas may be provided to the region of the weld.

8. In a torch for use in welding during which smoke or fumes are created, and having a nozzle through which welding current is delivered to a workpiece, the improvement in said nozzle comprising a first member having an end which may be placed in a region where smoke or fumes are generated, said member including means defining a first passageway therethrough, a second member coaxial with and surrounding said first member and spaced radially therefrom along an axis to define therebetween a chamber into which smoke or fumes may be drawn, said second member having an end spaced from the end of said first member along said axis, means on said first member positioned between the end of said second member and the end of said first member and extending radially outward from said axis to a distance substantially equal to the distance of radial spacing of said second member so as to form between the end of said second member and the means extending outwardly on said first member a substantially continuous opening forming the sole interconnection from external of said nozzle to said chamber, and means for connecting a source of negative pressure to said chamber to induce air flow into said opening thereby to remove smoke and fumes from a region laterally outwardly of said opening.

9. In a torch for use in welding during which smoke or fumes are created, and having a nozzle through which welding current is delivered to a workpiece, the improvement in said nozzle comprising a first member having an end which may be placed in a region where smoke or fumes are generated, said member including means defining a first passageway therethrough, second member coaxial with and surrounding said first member and spaced radially therefrom along an axis to define therebetween a chamber into which smoke or fumes may be drawn, means defining a substantially continuous opening into said chamber from the entire region laterally surrounding said second member, said opening facing predominantly outwardly to the sides of said nozzle and forming the sole passage into said chamber from the exterior of said nozzle, means for connecting a source of negative pressure to said chamber to induce air flow into said opening from the entire region around said opening, and an annular ring on said nozzle located rearwardly from the end of said first member and forward of said opening and extending radially outward with respect to said first member whereby said ring inhibits direct flow of gases between the region of the weld and said opening causing smoke and fumes from said weld first to flow outwardly and then be drawn laterally inwardly through said opening.

* * * * *